United States Patent
Moreau et al.

(10) Patent No.: US 10,371,183 B2
(45) Date of Patent: Aug. 6, 2019

(54) LOCKING BADGE CLAMP

(71) Applicant: TY-FLOT, INC., Manchester, NH (US)

(72) Inventors: Darrell A. Moreau, Manchester, NH (US); Andre W. Moreau, Bedford, NH (US)

(73) Assignee: Ty-Flot, Inc., Manchester, NH (US)

( * ) Notice: Subject to any disclaimer, the term of this patent is extended or adjusted under 35 U.S.C. 154(b) by 263 days.

(21) Appl. No.: 15/340,136

(22) Filed: Nov. 1, 2016

(65) Prior Publication Data

US 2018/0119714 A1    May 3, 2018

(51) Int. Cl.
| | | |
|---|---|---|
| *F16B 2/18* | (2006.01) | |
| *G09F 3/14* | (2006.01) | |
| *G09F 3/16* | (2006.01) | |
| *F16B 2/00* | (2006.01) | |
| *F16B 2/10* | (2006.01) | |

(52) U.S. Cl.
CPC ............... *F16B 2/185* (2013.01); *G09F 3/14* (2013.01); *G09F 3/16* (2013.01); *F16B 2/005* (2013.01); *F16B 2/10* (2013.01)

(58) Field of Classification Search
CPC .. F16B 2/185; F16B 2/005; F16B 2/10; G09F 3/14; G09F 3/16; A45F 5/02; Y10T 24/1394
See application file for complete search history.

(56) References Cited

U.S. PATENT DOCUMENTS

| | | | |
|---|---|---|---|
| 3,830,580 A | 8/1974 | Slattery et al. | |
| 5,640,742 A | 6/1997 | White et al. | |
| 7,243,402 B2 * | 7/2007 | Andersen | B60P 7/0807 24/517 |
| 7,261,264 B2 * | 8/2007 | Moran | A01K 1/0356 24/573.11 |

(Continued)

FOREIGN PATENT DOCUMENTS

| | | |
|---|---|---|
| JP | 3936773 B2 | 6/2007 |
| JP | 2009-112677 A | 5/2009 |

(Continued)

OTHER PUBLICATIONS

International Search Report dated Sep. 7, 2018, International Application PCT/US2017/057801 (3 pgs.).

*Primary Examiner* — Victor D Batson
*Assistant Examiner* — Matthew J Sullivan
(74) *Attorney, Agent, or Firm* — Dicke, Billig & Czaja, PLLC

(57) ABSTRACT

A clamp assembly includes a clamp having a lever attached to a clamp body and operable between an open position and a closed position, where the clamp body defines an elongated opening with a narrowed waist portion between a first opening portion and a second opening portion. A fastener has a base, a cap, and a stem extending between and connecting the base and the cap. The base and the cap extend radially outward from the stem. The stem is sized to fit through the narrowed waist portion and the cap is sized to fit (Continued)

through the first opening portion of the through opening. When the lever is in the closed position, a blocking member on the lever occupies the first opening portion of the through opening. When the lever is in the open position, the blocking member is withdrawn from the first opening portion of the through opening.

12 Claims, 7 Drawing Sheets

(56) References Cited

U.S. PATENT DOCUMENTS

| | | | | |
|---|---|---|---|---|
| 8,342,575 | B2* | 1/2013 | Coleman | A63C 5/16 |
| | | | | 24/298 |
| 9,027,212 | B2* | 5/2015 | Wu | F16B 2/10 |
| | | | | 224/269 |
| 9,073,495 | B2* | 7/2015 | Toutant | B60R 13/01 |
| 9,249,814 | B2* | 2/2016 | Tsai | A44B 15/00 |
| D763,673 | S | 8/2016 | Moreau et al. | |
| 9,949,558 | B2* | 4/2018 | Reed | A45F 5/02 |
| 2004/0045133 | A1 | 3/2004 | Buettell | |
| 2013/0097822 | A1* | 4/2013 | Mayberry | F16B 2/10 |
| | | | | 24/509 |
| 2013/0160256 | A1* | 6/2013 | Waldman | A43C 7/04 |
| | | | | 24/712.6 |
| 2016/0143384 | A1 | 5/2016 | Moreau et al. | |
| 2016/0183620 | A1 | 6/2016 | Moreau et al. | |
| 2016/0298664 | A1* | 10/2016 | Benson, Jr. | F16B 2/10 |
| 2017/0202361 | A1* | 7/2017 | White | F16B 2/10 |
| 2018/0142718 | A1* | 5/2018 | Zhu | F16B 2/185 |

FOREIGN PATENT DOCUMENTS

| | | | | |
|---|---|---|---|---|
| KR | 20-0408639 Y1 | 2/2006 | | |
| WO | WO-2012035299 A1 * | 3/2012 | | A47C 21/022 |

\* cited by examiner

LOCKING BADGE CLAMP

BACKGROUND OF THE INVENTION

1. Field of the Invention

The present invention relates generally to connectors and clamps. More particularly, the present invention relates to a clamp for papers and other small objects.

2. Description of the Prior Art

Lanyards are used to display name tags and credentials at trade shows, work sites, and special events. In many cases, the person's badge or credentials are clipped to a garment or lanyard. However, in high-security areas or exclusion zones, a dropped or lost badge can be a significant event that requires closing part of the facility.

In one example, workers at nuclear power plants work from a bridge crane that straddles a reactor vessel filled with cooling water. Moving along the bridge crane may cause the worker's badge to be pulled loose from the worker, such as by being caught on railings or equipment. If the worker's badge falls off the worker, it may land in the cooling water. If the badge cannot be retrieved before it sinks, then the retrieval process may be time consuming and very costly. Typically, a nuclear power plant will lose approximately $100,000 per hour of down time during a refueling or maintenance outage. Depending on where the badge comes to rest, it could take several hours to retrieve the badge and consequently delay the plant from coming back online.

One approach to attaching access badges and credentials to a person includes a small spring clip attached to a short plastic strap. One end of the strap attaches to a jaw of the clamp by a rivet extending through the strap and the jaw. The strap includes a snap button assembly in the middle and opposite end of the strap so that the strap can be folded on itself and snapped together to form a closed loop. Typically, the user loops the strap through an opening in an access badge and then snaps the strap together to close the loop. The clamp is then attached to the user's clothing to retain the access badge on the user's person.

SUMMARY OF THE INVENTION

The clamping devices of the prior art do not securely retain access badges and credentials. The snap button may be adequate for office settings, but can be inadvertently opened and allow the access badge to fall from the wearer. Other prior art clamping assemblies secure both ends of the strap to the clamp in a permanently-closed loop extending through the badge. However, after assembly, the strap loop cannot be opened to add or change access badges. Therefore, the user may need to wear several individual badges, each of which is connected to a separate clamp.

Therefore, what is needed is a clamp assembly that includes a clamp and removable fastener useful to secure a strap to the clamp. What is also needed is a clamp assembly that includes a strap attached to the clamp, where the strap can be selectively opened and closed by the user. What is further needed is a clamp assembly where the strap is securely attached to the clamp when the clamp is in the closed position.

Accordingly, an object of the present invention is to provide a clamp assembly with a clamp and a removable fastener useful to secure a strap to the clamp in a closed-loop configuration. It is another object for the clamp assembly to enables the user to open the closed loop to add or exchange access badges or other items retained by the strap.

The present invention achieves this and other objectives by providing a badge clamp assembly that includes a clamp with a fastener removably installed in the clamp body to retain a strap. In one embodiment, the clamp is a lever-operated clamp with a fastener removably attached to the clamp.

In one embodiment the clamp assembly has a clamp body defining an open-ended slot on a proximal end portion and defining an elongated through opening in a distal end portion with a first opening portion, a second opening portion, and a narrowed waist portion between the first opening portion and the second opening portion, wherein the second opening portion is smaller than the first opening portion. A lever has an arm and a handle, where the lever is rotatably attached to the clamp body and operable between an open position and a closed position. The lever has a blocking member extending transversely from the arm adjacent the handle. When the lever is in the closed position, the lever closes the mouth and positions the blocking member to occupy the first opening portion of the through opening. When the lever in the open position, the mouth is open and the blocking member is withdrawn from the first opening portion. A fastener is constructed to be installed in the elongated through opening and has a base, a cap, and a stem extending between and connecting the base and the cap. The base and the cap extend radially outward from the stem and the stem is sized to be received through the narrowed waist of the through opening. The cap is sized to be received through the first opening portion of the through opening.

In another embodiment, a clamp assembly includes a clamp having a lever attached to a clamp body and operable between an open position and a closed position, where the clamp body defines an elongated fastener opening to receive a fastener. In one embodiment, the clamp body has a proximal end portion with an upper jaw and a lower jaw extending in a spaced-apart relation to define a mouth and a distal end portion extending away from the proximal end portion and defining an elongated through-opening with a first opening portion, a second opening portion, and a narrowed waist portion between the first opening portion and the second opening portion. The lever has an arm extending between and connecting a handle and a lever head, where the lever head is rotatably connected to the proximal end portion. A tooth extends transversely from the lever head and a blocking member extends transversely from the arm adjacent the handle. The lever is operable between an open position and a closed position. When the lever is in the closed position, the tooth extends towards the lower jaw to close the mouth and the blocking member occupies the first opening portion of the through opening. When the lever is in the open position, the tooth pivots to open the mouth and the locking member is withdrawn from the first opening portion of the through opening. A fastener has a base, a cap, and a stem extending between and connecting the base and the cap. The base and the cap extend radially outward from the stem. The stem is sized to be received through the narrowed waist of the body portion and the cap is sized to be received through the first opening portion of the through opening.

In another embodiment, the clamp assembly includes one or more strap made of a flexible and resilient material. The strap extends between a first end portion and a second end portion, where each end portion defines a fastener opening sized to receive the stem of the fastener. In some embodiments, the flexible and resilient material permits the strap to temporarily deform to receive the cap of the fastener through the fastener opening.

In another embodiment, the elongated through opening has a resilient tab extending into the through opening adjacent the narrowed waist portion, where moving the fastener between the first opening portion and the second opening portion deflects the resilient tab to enlarge the narrowed waist portion sufficiently for the fastener stem to pass through the narrowed waist portion.

In another embodiment, the lever and the clamp body have a snap fit or interference fit when the lever is in the closed position. For example, the lower jaw defines a gripping member that provides the snap fit with the tooth on the lever head when the lever is moved to the closed position. In one embodiment, the gripping member is a plurality of teeth, a ridge, a slot, a groove, a recess, a textured surface, or one or more protrusions.

DETAILED DESCRIPTION OF THE INVENTION

Figure 1:
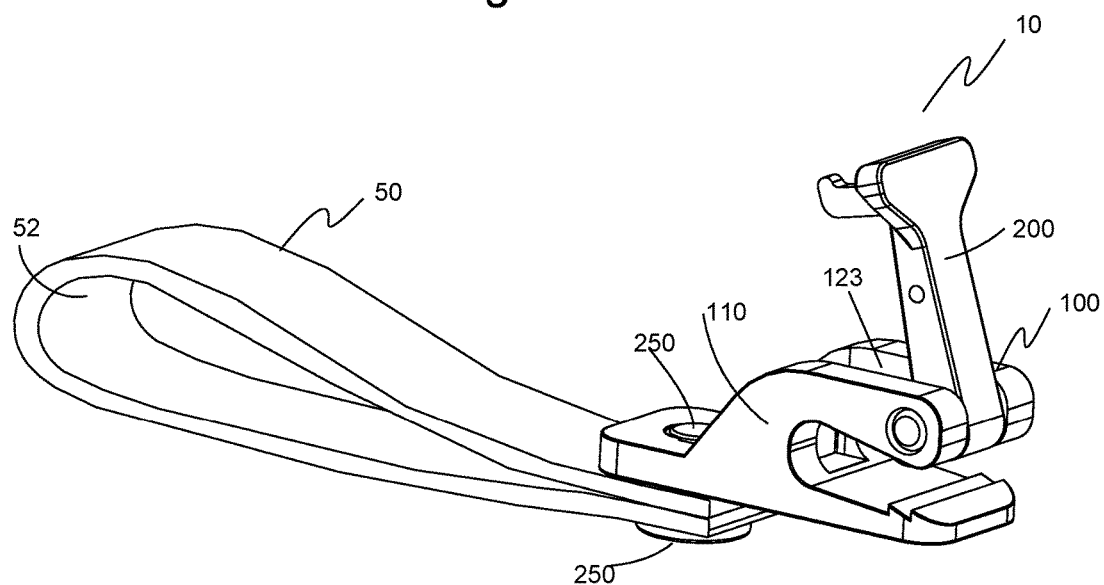
FIG. 1 is a front, top, and side perspective illustration of one embodiment of a clamp assembly of the present invention including a clamp, a fastener, and a strap, where the clamp is in the open position.
Figure 2:
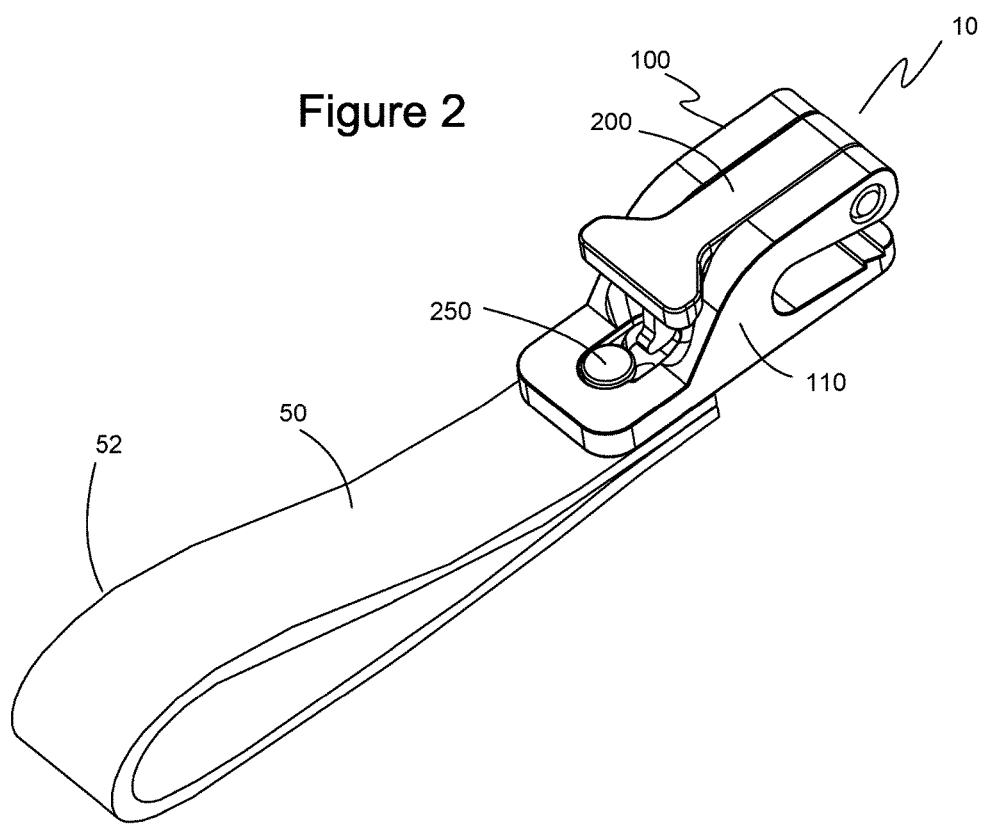
FIG. 2 is rear, top, and side perspective illustration of the clamp assembly of FIG. 1 showing the clamp in the closed position with the blocking member on the handle extending to occupy part of the opening in the clamp body.

Embodiments of the present invention are illustrated in FIGS. 1-10. Referring to FIGS. 1 and 2, a front and side perspective illustration and a top and rear perspective illustration, respectively, show one embodiment of a clamp assembly 10 that includes a flexible strap 50 forming a closed loop 52 that is releasably secured to a clamp 100 with a fastener 250 extending through strap 50 and clamp 100. Clamp 100 includes a lever 200 connected to clamp 100, where lever 200 is operable between an open position (shown in FIG. 1) and a closed position (shown in FIG. 2). Components of clamp assembly 10 are discussed in more detail below.

Figure 3:
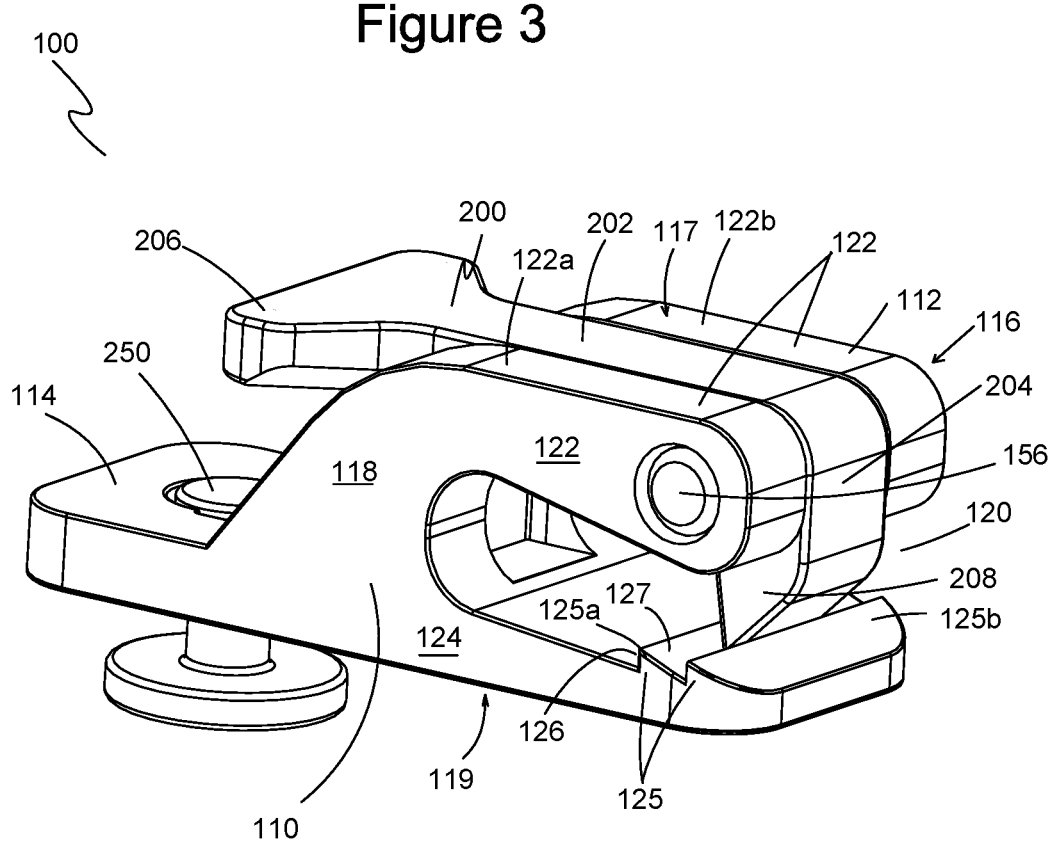
FIG. 3 is a front, top, and side perspective illustration of the clamp FIG. 1 showing the clamp in the closed position.

Referring now to FIG. 3, a front and side perspective illustration shows clamp 100 of FIGS. 1-2 with lever 200 in the closed position. Clamp 100 has a clamp body 110 that extends between a proximal end portion 112 and a distal end portion 114. Clamp body 110 extends laterally from a first body side 116 to a second body side 118 and between a top surface 117 and bottom surface 119.

In one embodiment, distal end portion 114 extends rearward from proximal end portion 112 and has substantially uniform thickness. Distal end portion 114 defines an elongated through opening 106 to receive fastener 250 therethrough.

Proximal end portion 112 defines a mouth 120 extending into clamp body 110 to receive papers, fabric (e.g., a lapel or shirt tail), a closed-loop connector, cord, or other small objects. In one embodiment, mouth 120 is configured as an open-ended slot with an upper jaw 122 and a lower jaw 124 that are spaced apart from each other by the slot and extend proximally in a spaced-apart, substantially parallel relationship. In one embodiment, upper jaw 122 and lower jaw 124 are spaced apart by about five millimeters. In one embodiment, upper jaw 122 includes first and second upper jaw members 122a, 122b separated laterally by a gap 123 (shown in FIG. 1) that receives lever 200. For example, lever 200 resides between first and second upper jaw members 122a, 122b and connects to upper jaw 122 by an axle or pin 156 extending through first and second upper jaw members 122a, 122b and lever head 204. In another example, pin 156 is part of lever 200 and extends laterally in opposite directions from lever head 204 to engage openings in first and second upper jaw members 122a, 122b.

In one embodiment, lever 200 has an arm 202 extending between a lever head 204 and a lever handle 206. A lever tooth 208 extends transversely from lever head 204 towards lower jaw 124 when lever 200 is in the closed position. Lever 200 pivots about lever head 204, such as rotating about a pin 156, protrusion, or other structure that engages first and second upper jaw members 122a, 122b.

In one embodiment, lower jaw 124 defines one or more gripping member 125 such as a ridge, a textured surface, one or more teeth, a protrusion, a recess, a groove, or other structure that facilitates clamp 100 gripping a pliable item placed in mouth 120. In some embodiments, gripping member 125 engages tooth 208 with a snap fit when lever 200 is in the closed position. In one embodiment, gripping member 125 is one or more teeth that each have a rear face 126 and a sloped front surface 127, where rear face 126 extends substantially perpendicularly from lower jaw 124 to meet sloped front surface 127 extending towards lower jaw. Sloped surface extends towards lower jaw 124 at a shallow compared to the tangent of arc for tooth 208 as it rotates between the closed position to the open position. As lever 200 pivots toward the closed position, tooth 208 engages first lower tooth 125a, which acts as a sear. For example, tooth 208 first contacts a rear face 126 of first lower tooth 125a when lever 200 is moved to the closed position. When sufficient force is applied to lever 200, tooth 208 and/or lever 200 and/or clamp body 110 deform slightly and allow tooth 208 to pass over first lower tooth 125a and snap into a resting position against rear surface 126b of second lower tooth 125b, which acts as a stop for tooth 208. When moving lever 200 from the closed position to the open position, tooth 208 similarly overcomes first lower tooth 125a to snap open after clearing first lower tooth 125a.

Figure 4:
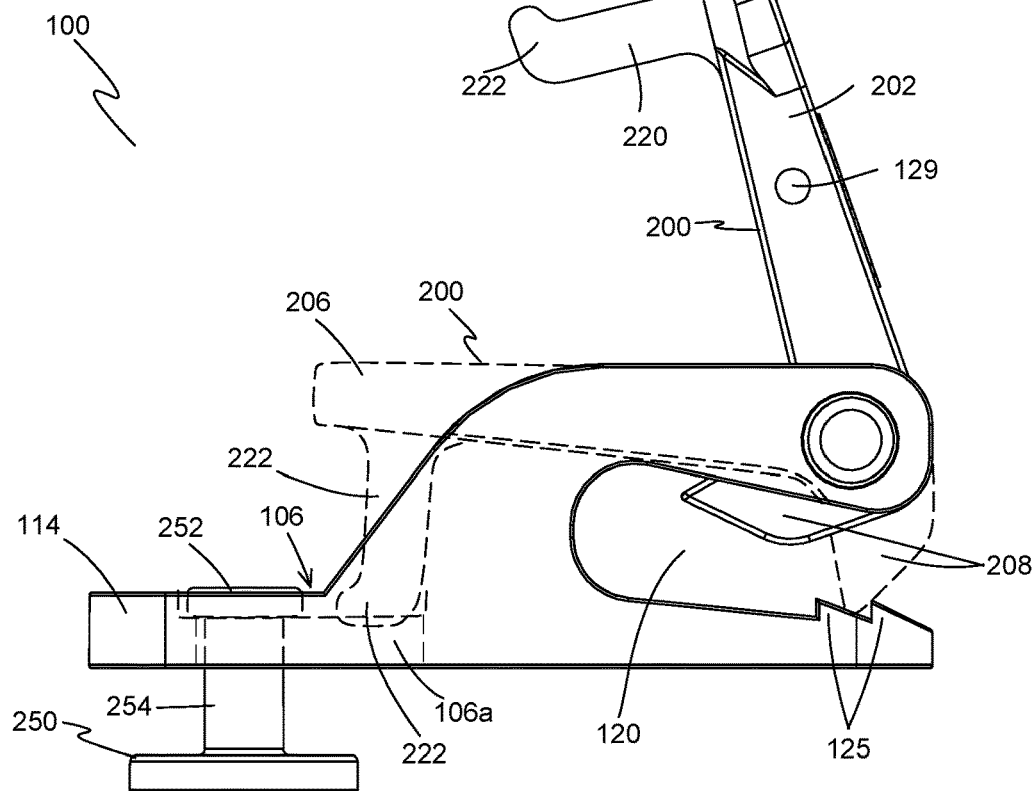
FIG. 4 is a side elevational illustration of the clamp of FIG. 1 showing the lever in the open position and the fastener extending through the through opening in the distal end portion.

Referring now to FIG. 4, a side elevational view shows clamp 100 with lever 200 in the open position and an outline of lever 200 in the closed position. Fastener 250 extends through distal end portion 114 of clamp body 110. When lever 200 is in the open position, tooth 208 is disengaged from gripping member 125 and rotated partially or completely out of mouth 120, thereby allowing a small object to enter mouth 120. When lever 200 is in the closed position, tooth 208 engages gripping member 125 and blocks egress from mouth 120. For example, tooth 208 abuts second tooth 125b and arm 202 abuts clamp body 110. As such, an object in mouth 120 being pulled in a proximal direction is blocked from exiting mouth 120 by tooth 208.

A blocking member 220 extends transversely from arm 202 adjacent handle 206. Blocking member 220 extends from arm 202 in generally the same direction as tooth 208 extends from head 204. In one embodiment, blocking member 220 is a post or similar structure that is sized to occupy through opening 106 in distal end portion 114. As shown, for example, blocking member 220 has a lower end 222 that extends distally a short distance to obstruct first opening portion 106a. When lever 200 is in the closed position in some embodiments, lower end 222 may extend distally to abut fastener cap 252 or to reach under fastener cap 252 to abut stem 254.

When lever 200 is in the closed position, blocking member 220 extends toward and partially into through opening 106. By extending partially into through opening 106, blocking member 220 more effectively prevents fastener 250 from moving proximally by obstructing through opening 106. Also, blocking member 220 abuts or nearly abuts clamp body 110 and therefore resists deformation or bending due to pressure applied from fastener 250.

Optionally, lever 200 has a protrusion 129 that engages clamp body 110 with an interference fit or a snap fit when lever 200 is in the closed position. Similarly, protrusion 129 may additionally or alternately extend from clamp body 110 to engage lever 200.

Figure 5:
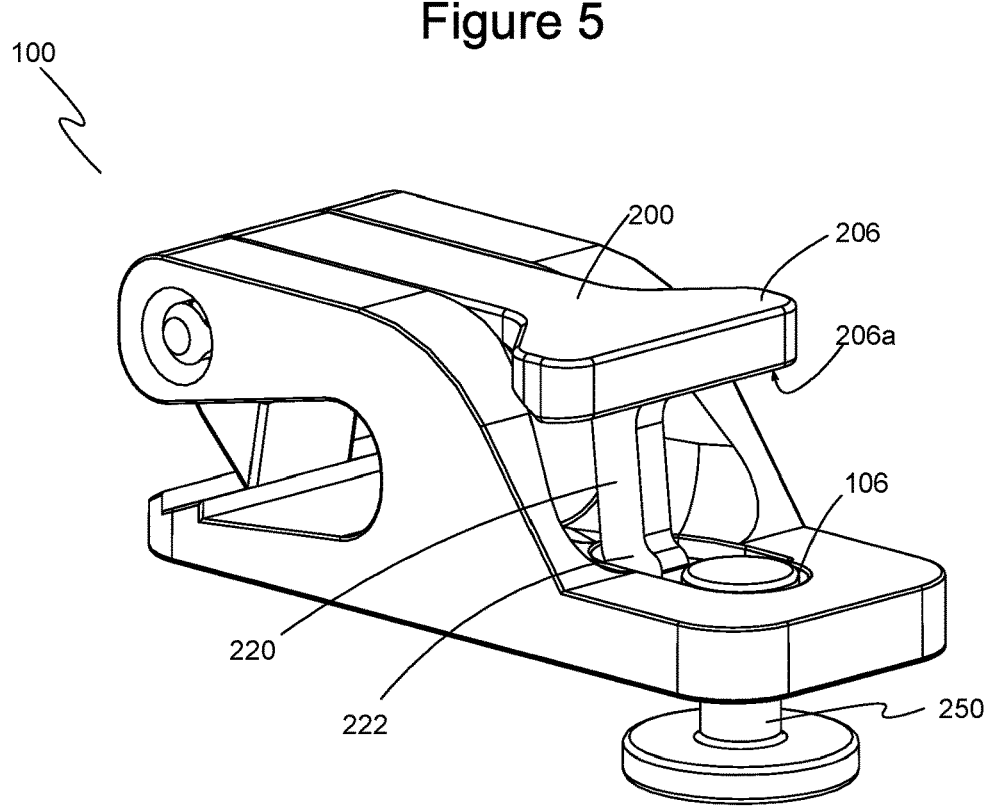
FIG. 5 is rear, top, and side perspective illustration of the clamp of FIG. 1 showing the blocking member maintaining the fastener in the second opening portion of the through opening.

Referring now to FIG. 5, a rear and side perspective view show clamp 100 with lever 200 in the closed position. Blocking member 220 extends down from handle 206 and partially into through opening 106. Lower end portion 222 extends distally to obstruct fastener 250 from moving proximally in through opening 106.

Figure 6:
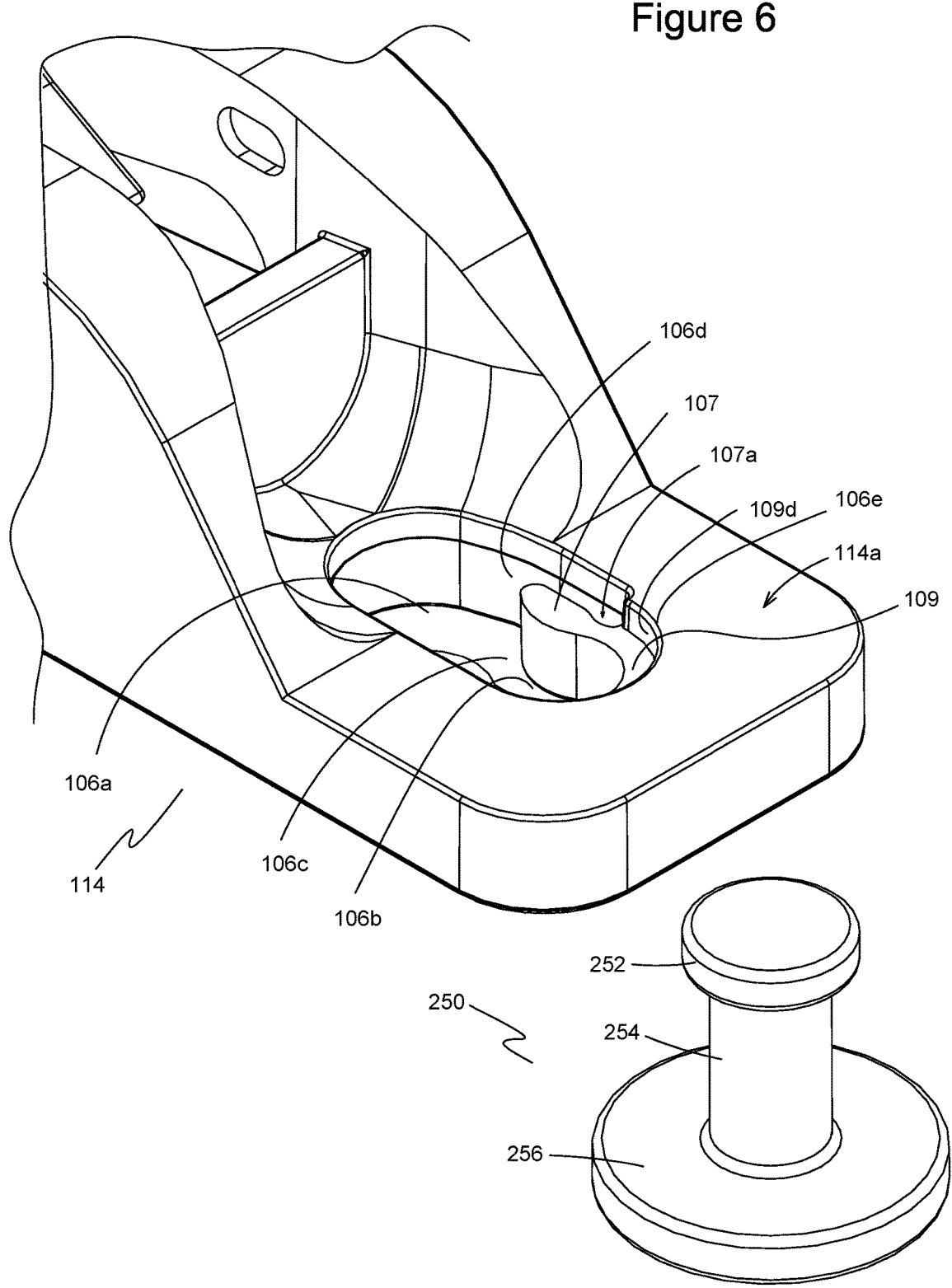
FIG. 6 is a rear, top, and side perspective illustration showing a close-up view of the distal end portion of the clamp and a fastener separate from the clamp.

Referring now to FIG. 6, a rear and side perspective illustration shows an enlarged view of distal end portion 114 of clamp 100 and one embodiment of fastener 250 separated from clamp 10. In one embodiment as shown, fastener 250 has a fastener stem 254 extending between and connecting a fastener cap 252 and a fastener base 256. Fastener stem 254 has a smaller diameter or cross-sectional size than either fastener cap 252 or fastener base 256. In some embodiments, fastener cap 252 and fastener base 256 are shallow cylinders or disks, and fastener stem 252 is cylindrical. Other cross-sectional shapes are acceptable. Fastener cap 252 and fastener base 256 extend radially outward from fastener stem 254. In one embodiment, fastener cap 252 has a smaller diameter than fastener base 256. In other embodiments, fastener base 256 is the same size (or smaller) than fastener cap 252, depending on the size and configuration of fastener openings in strap 50.

In one embodiment, through opening 106 is elongated and has a first opening portion 106a with a first size and a second opening portion 106b with a second size smaller than the first size. A narrowed waist portion 106c is positioned between first opening portion 106a and second opening portion 106b. In some embodiments, for example, through opening 106 is an elongated slot with a generally oval or racetrack shape. In other embodiments, through opening 106 has an hourglass or figure-eight shape.

First opening portion 106a is sized to receive fastener cap 252 and fastener stem 254. Narrowed waist 106c is sized to permit fastener stem 254 to slide distally while providing a snap fit with fastener stem 254. That is, fastener 250 must overcome some interference between fastener stem 254 and waist 108c for fastener 250 to move from first opening position 106a to second opening portion 106b or vice versa. In one embodiment, a snap fit is accomplished by sizing waist 106c to be the same size or just slightly smaller than fastener stem 254, where forcing fastener stem through waist 106c results in temporary deformation of through opening 106 and/or fastener stem 254. In such embodiments, plastic or like materials are suitable since they are relatively soft and allow such deformation.

In other embodiments, through opening 106 includes a resilient tab 107 that extends into through opening 106. For example, resilient tab 107 extends from sidewall 106d in a proximal direction along through opening 106 and defines a gap 107a between resilient tab 107 and sidewall 106d. As fastener stem 254 is pressed proximally or distally through waist 106c, resilient tab 107 bends towards sidewall 106d to make way for fastener stem 254.

In some embodiments, distal end portion 114 defines a ledge 109 along second opening portion 106b and that extends radially outward from second opening portion 106b. Ledge 109 is generally parallel with and recessed below the top surface 114a of distal end portion 114 and provides a surface to receive fastener cap 252 when fastener 252 occupies second opening portion 106b. As ledge 109 extends along second opening portion 106, ledge sidewall 109d extends up from ledge 109 to top surface 114a to provide the appearance of a generally oval outline 106e of through opening 106 as viewed from above. Ledge 109 provides a recessed surface to receive and support fastener cap 252 when fastener stem 254 occupies second opening portion 106b, where fastener cap 252 may be stabilized by ledge sidewall 109a, ledge 109, and sidewall 106d. In other embodiments, no recessed ledge 109 is present and fastener cap 252 is supported on or overlaps top surface 114a of distal end portion when fastener 250 occupies second opening portion 106b.

Figure 7:
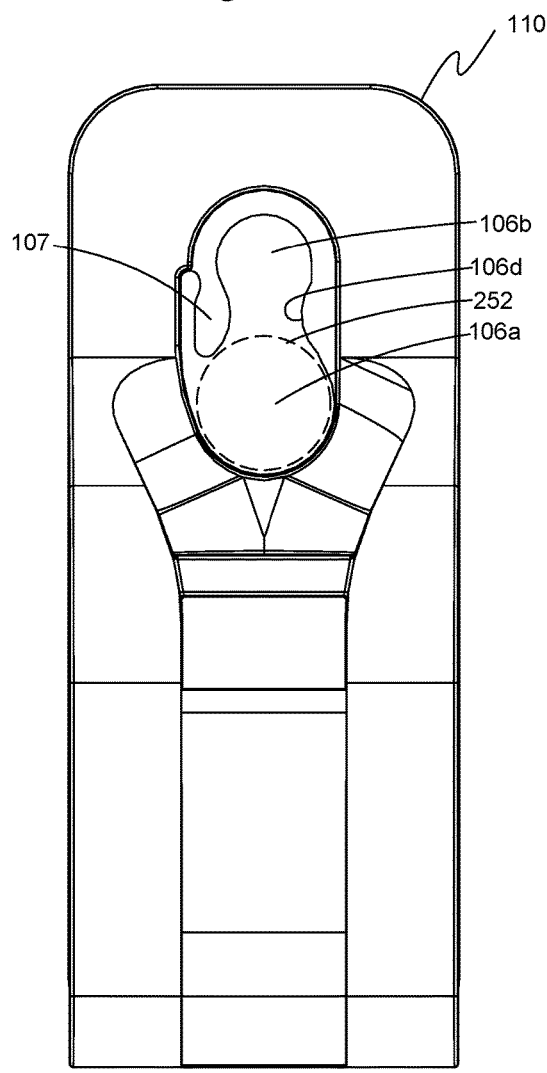
FIG. 7 is a top plan illustration of the clamp body of FIG. 1 showing an outline of the fastener cap relative to the first opening portion.
Figure 8:
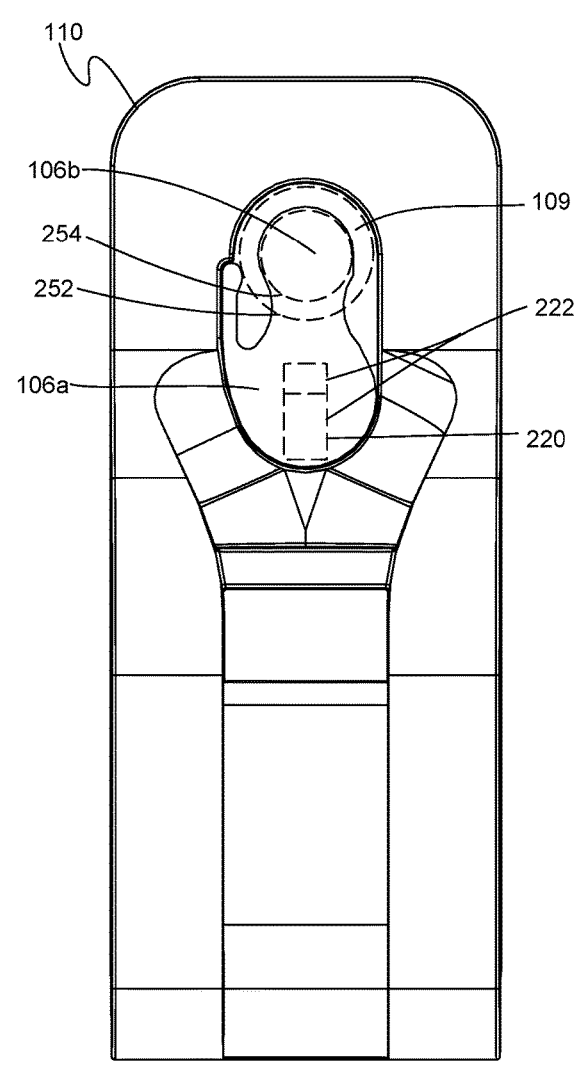
FIG. 8 is a top plan illustration of the clamp body of FIG. 1 showing an outline of the fastener stem and fastener cap in the second opening portion and an outline of the blocking member occupying the first opening portion.

Referring now to FIGS. 7 and 8, top plan views show clamp body 110 without lever 200. Through opening 106 generally has a figure-eight shape with first opening portion 106a sized larger than second opening portion 106b. Narrowed waist 106c is defined in part by resilient tab 107 and in part by sidewall 106d extending into through opening 106. As shown in FIG. 7, first opening portion 106a is sized for passage of fastener cap 252, which is illustrated in a broken line to show its cross-sectional size.

Referring to FIG. 8, through opening 106 is illustrated with outlines representing the cross-sectional size of fastener stem 254, fastener cap 252, and blocking member 220. Second opening portion 106b is sized for passage of fastener stem 254 with fastener cap 252 overlapping ledge 109. FIG. 8 also illustrates an outline of lower end 222 of blocking member 220 to show its position in first opening portion 106a when lever 200 is in the closed position. With blocking member 220 creating an obstruction in first opening portion 106a, fastener 250 is prevented from moving to first opening portion 106a and therefore prevented from being removed from clamp body 110. Since second opening portion 106b is sized smaller than fastener cap 252 or fastener base 256, fastener 250 cannot separate from clamp body 110 absent failure of one or more components of clamp 100.

Figure 9:
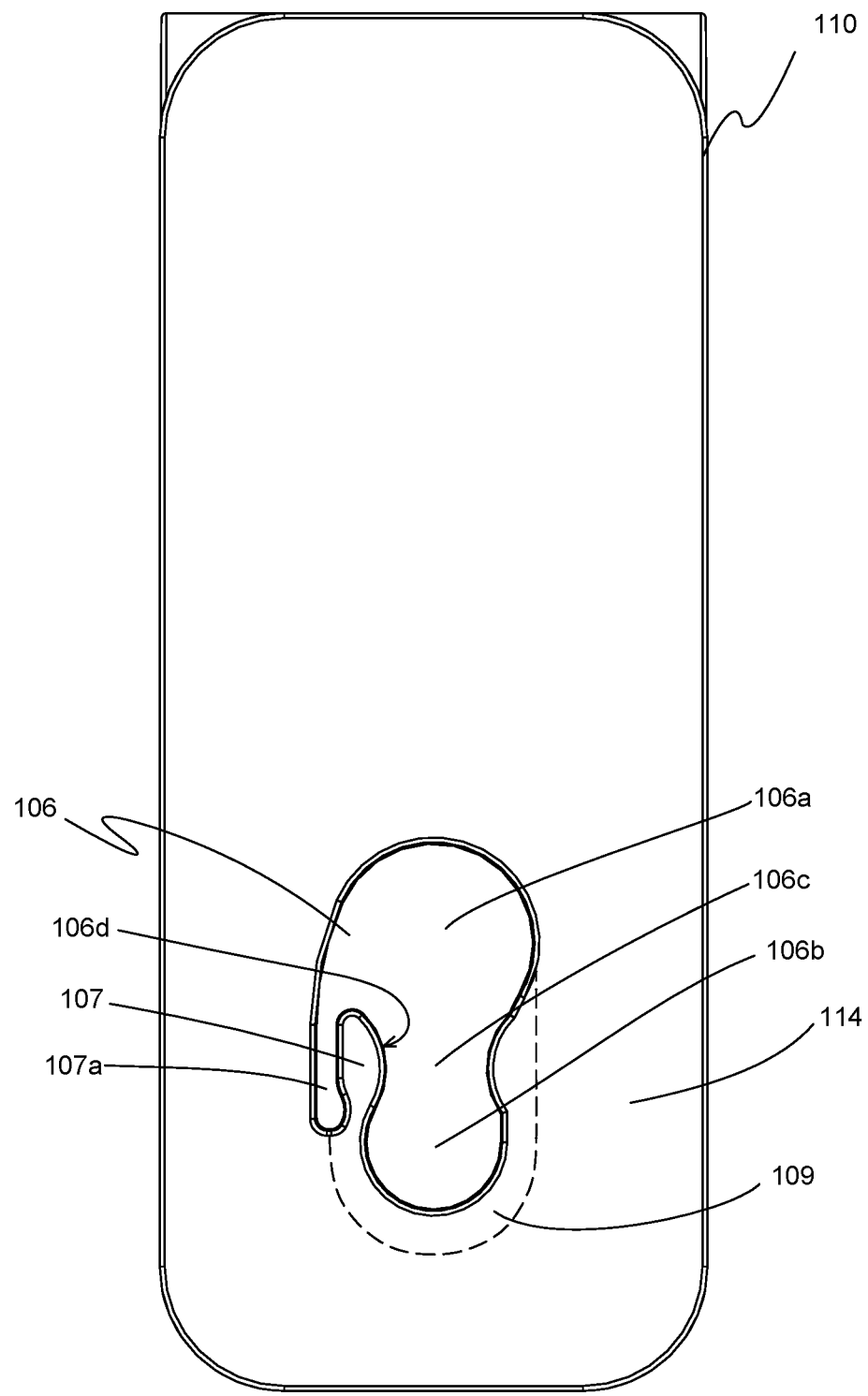
FIG. 9 is a bottom plan illustration showing the through opening in the distal end portion of the clamp body.

Referring now to FIG. 9, clamp body 110 is shown in a bottom plan view. Through opening 106 in distal end portion 114 generally has a figure-eight shape, where first opening portion 106a is larger than second opening portion 106b as discussed above. Sidewall 106d defines resilient tab 107 and gap 107a allowing deflection of tab 107. Ledge 109 is illustrated in a broken line for reference.

Figure 10:
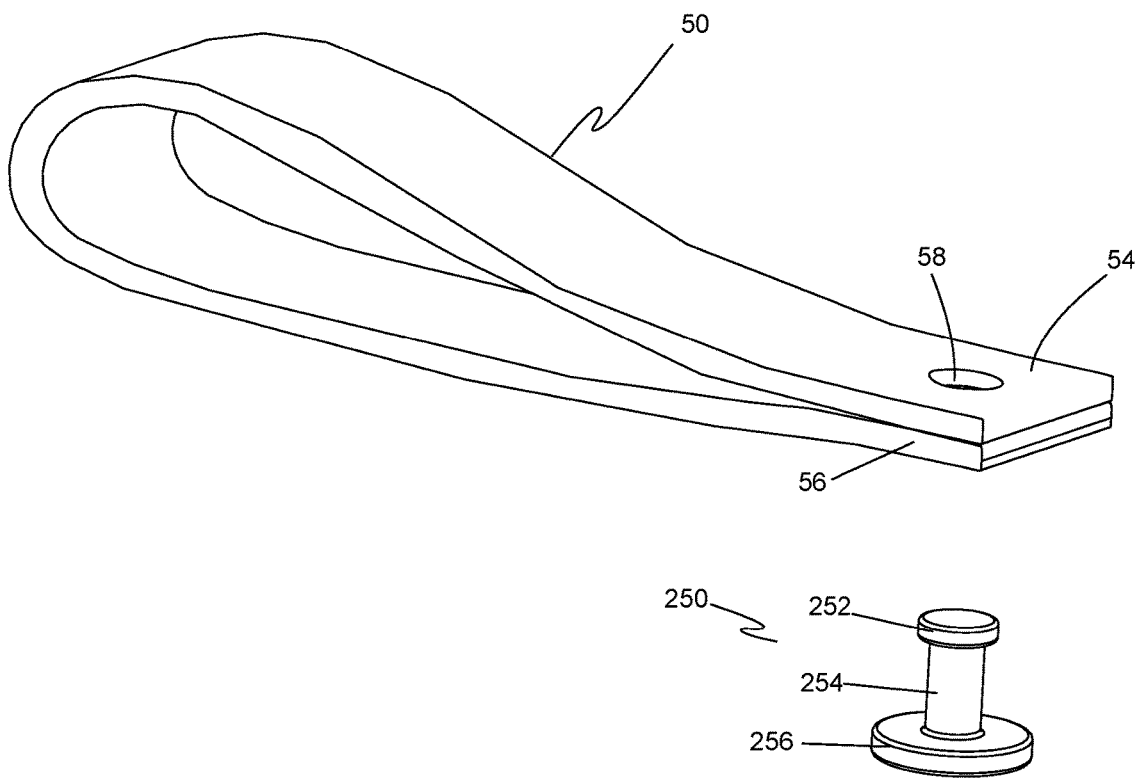
FIG. 10 is a front, top, and side perspective illustration of one embodiment of a strap and fastener of the present invention.

Referring now to FIG. 10, strap 50 and fastener 250 of FIG. 1 are shown in a side perspective illustration. Strap 50 is a length of resilient and pliable material that extends longitudinally from a first end portion 54 to a second end portion 56. Strap 50 may be folded on itself with first end portion 54 aligned with and abutting second end portion 56. First and second end portions 54, 56 each define a fastener opening 58 sized for fastener stem 254 to pass therethrough. In some embodiments, fastener openings 58 are slightly smaller than the cross-sectional size of fastener stem 254 to provide snug engagement between strap 50 and fastener 250. Being made of a pliable material, strap 50 may deform at fastener openings 58 to accommodate a slightly larger fastener stem 254 and to allow even larger fastener cap 252 to be pressed through fastener openings 58. After fastener cap passes through fastener openings 58, the resiliency of strap 50 returns fastener openings 58 to the original size and shape to the extent permitted by fastener stem 254.

In use, embodiments of clamp assembly 10 are useful to retain an access badge or other object on an user's person. First, the user will feed strap 50 through an opening in the access badge or other object to the retained. Second, the user will install fastener 250 through strap 50 by aligning fastener openings 58 on first and second end portions 54, 56 and then pressing fastener cap 252 through fastener openings 58. Third, with lever 200 in the open position, fastener cap 252 is inserted through first opening portion 106a of through opening 106 in distal end portion 114 of clamp body 110 so that fastener stem 254 is positioned to pass through narrowed waist portion 106c. Fourth, the user moves fastener 250 distally to second opening portion 106b of through opening. To do so, the user may pull on strap 50 or apply force directly to fastener 250 to overcome interference forces of narrowed waist 106c and resilient tab 107 when present. Fifth, clamp 100 is now ready to attach to the user's clothing or other point of attachment by inserting the clothing (e.g., a shirt tail or lapel) or other attachment structure into slot 120 and moving lever 200 to the closed position. In the closed position, blocking member 220 occupies first opening portion 106a to prevent fastener 250 from separating form clamp 100.

To exchange, remove, or add other access badges to clamp assembly 10, the user moves lever 200 to the open position, thereby removing blocking member 220 from first opening portion 106a. Next, fastener 250 is moved to the first opening portion 106a, where it can be removed from clamp 100 along with strap 50. The user may now open closed loop 52 of strap 50 to exchange a badge, or may add an additional strap 50 with another badge.

Clamp assembly 10 advantageously retains strap(s) 50 due to blocking member 220 obstructing fastener 50 from occupying first opening portion 106a where it may be removed from clamp 100. To additionally secure fastener 50 in second opening portion 106b, narrowed waist 106c and/or resilient tab 107 provide a snap fit with fastener 50 that reduces the ability of fastener 50 to move along through opening 106 to first opening portion 106a where it can be removed from clamp 100. To further secure fastener 50 in second opening portion 106b, lever 200 has tooth 208 that engages gripping member 125 with a snap fit that locks lever 200 in the closed position to the extent of force necessary to release the snap fit. The snap fit between tooth 208 and gripping member 125 resists lever 200 from easily or inadvertently moving from the closed position to the open position.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

The invention claimed is:

1. A clamp assembly comprising:
a clamp comprising: a clamp body comprising a proximal end portion with an upper jaw and a lower jaw extending in a spaced-apart relation to define a mouth and a distal end portion extending away from the proximal end portion and defining an elongated through-opening with a first opening portion, a second opening portion, and a narrowed waist portion between the first opening portion and the second opening portion; a lever comprising:
an arm extending between and connecting a handle and a lever head, the lever head rotatably connected to the proximal end portion of the clamp body;
a tooth extending transversely from the lever head;
a blocking member extending transversely from the arm adjacent the handle and in a same general direction as the tooth;
wherein the lever is operable between an open position and a closed position, wherein in the closed position the tooth extends towards the lower jaw to close the mouth and the blocking member occupies extends at least partially into the first opening portion, and wherein in the open position, the tooth pivots to open the mouth and the blocking member is withdrawn from the first opening portion of the through opening;
a fastener having a base, a cap, and a stem extending between and connecting the base and the cap, wherein the base and the cap extend radially outward from the stem, wherein the stem is sized to be received in the through opening and pass through the narrowed waist portion between the first opening portion and the second opening portion, and wherein the cap is sized to be received through the first opening portion of the through opening; and
wherein in the closed position the blocking member prevents the fastener from moving proximally within the first opening portion of the through opening.

2. The clamp assembly of claim 1 further comprising:
a strap made of a flexible and resilient material and having a first end portion and a second end portion, wherein each of the first end portion and the second end portion defines a fastener opening sized to receive the stem of the fastener.

3. The clamp assembly of claim 1 further comprising a resilient tab extending into the through opening adjacent the narrowed waist portion, wherein moving the fastener between occupying the first opening portion and the second opening portion deflects the resilient tab to enlarge the narrowed waist portion sufficiently for the fastener stem to pass through the narrowed waist portion of the through opening.

4. The clamp assembly of claim 1, wherein the lever and the clamp body have a snap fit when the lever is in the closed position.

5. The clamp assembly of claim 4, wherein the lower jaw defines a gripping member that provides the snap fit with the tooth on the lever head when the lever is in the closed position.

6. The clamp assembly of claim 5, wherein the gripping member is selected from the group consisting of a plurality of teeth, a ridge, a slot, a textured surface, one or more protrusions, a recess, and a groove.

7. A clamp assembly comprising:
a clamp body defining an open-ended slot on a proximal end portion and defining an elongated through opening in a distal end portion with a first opening portion, a second opening portion, and a narrowed waist portion between the first opening portion and the second opening portion, wherein the second opening portion is smaller than the first opening portion;
a lever with an arm and a handle, the lever being rotatably attached to the clamp body and operable between an open position and a closed position, wherein the lever has a blocking member extending transversely from the arm adjacent the handle, and wherein the lever in the closed position closes the mouth and positions the blocking member to extend at least partially into the first opening portion of the through opening, and wherein the lever in the open position opens the mouth and withdraws the blocking member from the first opening portion;
a fastener constructed to be installed in the elongated through opening and having a base, a cap, and a stem extending between and connecting the base and the cap, wherein the base and the cap extend radially outward from the stem, wherein the stem is sized to be received through the narrowed waist portion of the through opening, and wherein the cap is sized to be received through the first opening portion of the through opening; and
wherein in the closed position the blocking member prevents the fastener from moving proximally within the first opening portion of the through opening.

8. The clamp assembly of claim 7 further comprising:
one or more strap made of a flexible and resilient material and having a first end portion and a second end portion, wherein each of the first end portion and the second end portion defines a fastener opening sized to receive the stem of the fastener.

9. The clamp assembly of claim 7 further comprising a resilient tab extending into the through opening adjacent the narrowed waist portion, wherein moving the fastener between occupying the first opening portion and the second opening portion deflects the resilient tab to enlarge the narrowed waist portion sufficiently for the fastener stem to pass through the narrowed waist portion of the through opening.

10. The clamp assembly of claim 7, wherein the lever and the clamp body have a snap fit or an interference fit when the lever is in the closed position.

11. The clamp assembly of claim 10, wherein the lower jaw defines a gripping member that provides the snap fit with a tooth on the lever head when the lever is in the closed position.

12. The clamp assembly of claim 11, wherein the gripping member is selected from the group consisting of a plurality of teeth, a ridge, a slot, a textured surface, one or more protrusions, a recess, and a groove.

* * * * *